United States Patent

Sass

[11] Patent Number: 5,966,717
[45] Date of Patent: Oct. 12, 1999

[54] METHODS FOR IMPORTING DATA BETWEEN DATABASE MANAGEMENT PROGRAMS

[75] Inventor: Jonathan M. Sass, Truckee, Calif.

[73] Assignee: Apple Computer, Inc., Cupertino, Calif.

[21] Appl. No.: 08/780,102

[22] Filed: Dec. 20, 1996

[51] Int. Cl.⁶ .................................................. G06F 17/00
[52] U.S. Cl. ......................... 707/204; 707/505; 707/540; 707/102; 345/335
[58] Field of Search ...................... 707/1–206, 501–540; 706/11–45; 395/701–705; 364/274–282.1; 345/335–976; 348/620–701; 340/990; 711/169

[56] References Cited

U.S. PATENT DOCUMENTS

| | | | |
|---|---|---|---|
| 5,386,507 | 1/1995 | Teig et al. | 345/346 |
| 5,392,390 | 2/1995 | Crozier | 707/505 |
| 5,555,366 | 9/1996 | Teig et al. | 711/169 |
| 5,566,330 | 10/1996 | Sheffield | 707/4 |
| 5,586,329 | 12/1996 | Knudsen et al. | 395/705 |
| 5,596,752 | 1/1997 | Knudsen et al. | 395/701 |
| 5,619,995 | 4/1997 | Lobodzinski | 348/77 |
| 5,666,553 | 9/1997 | Crozier | 707/203 |
| 5,682,535 | 10/1997 | Kundsen | 707/1 |
| 5,684,990 | 11/1997 | Boothby | 707/1 |
| 5,701,423 | 12/1997 | Crozier | 707/102 |
| 5,752,018 | 5/1998 | Sheffield | 707/2 |
| 5,767,854 | 6/1998 | Anwar | 345/355 |
| 5,826,522 | 10/1998 | Wolters | 707/1 |
| 5,832,481 | 11/1998 | Sheffield | 707/4 |
| 5,835,900 | 11/1998 | Fagg, III et al. | 706/11 |
| 5,848,373 | 12/1998 | DeLorme et al. | 340/990 |
| 5,877,819 | 3/1999 | Branson | 348/701 |

*Primary Examiner*—Wayne Amsbury
*Assistant Examiner*—David Y. Jurg
*Attorney, Agent, or Firm*—Beyer & Weaver, LLP

[57] ABSTRACT

A computer-implemented method in a computer for importing data from an import database to a target database. The method includes displaying a plurality of import items associated with one of the plurality of import records in an import window of a display screen of the computer. The plurality of import items represent at least one of the plurality of import data fields and the plurality of import headers associated with the one of the plurality of import records. There is further included displaying a target window in the display screen, thereby causing the target window to appear simultaneously with the import window in the display screen. The target window includes a plurality of target data fields corresponding to a plurality of target headers and substantially resembles one of a window employed for manual data entry of records and a window employed for data display for the database management program. The method further includes moving an import item of the plurality of import items in the import window to a position in the target window. The position corresponds to a target item of a target record of the target database, the target item representing a target data field if the item represents one of the plurality of import data fields. The target item represents a target header if the item represents one of the plurality of import headers.

20 Claims, 7 Drawing Sheets

FIG. 2A

Customer Information Mapping

What to do For each entry below drag the data from the list and drop it on a box where the information belongs ? Customer_Key
? Prefix
? Middle_Initial
? Individual
? Title
? Unique_Busine
? Address1_Line
? Address1_Line
? Address1_City
? Address1_State
? Address1_Zip
? Address1_Coun Name
Prefix | First [First_Name] | Sufix | Last [Last_Name]

Company [Company_Name]
Title

Home Address
Street [Address1_Label]
City | State | ZIP
Country

Phones
Home
Work
Fax
Email

Work Address
City | State | ZIP
Country

Custom Fields
Custom1
Custom2
Custom3
Custom4
Custom5
Custom6
Custom7
Custom8
Custom9
Custom10

Next Contact

Record Number 1 of 2

This entry is blank, try scrolling through some of the other records --->

☐ Use this record

< Back | Next > | Cancel | Help

METHODS FOR IMPORTING DATA BETWEEN DATABASE MANAGEMENT PROGRAMS

BACKGROUND OF THE INVENTION

The present invention relates to database management programs. More particularly, the present invention relates to apparatus and methods therefor that permit, in an efficient and highly intuitive manner, data stored in a first database format to be imported into a second database having a different data format.

Database management programs and data structures therefor are known. There are currently existing many different database management programs, many of which employ different formats in organizing their data. For ease of discussion, the discussion below is made with reference to a particular type of database management program known as personal information manager (PIM), although the techniques disclosed herein may be applied to any type of database program that organizes its data into records and record fields.

In the current art, when a user wishes to switch from one personal information manager program to another personal information manager program, he or she may wish to import data that has been created and in use in the old personal information manager program into the new personal information manager program. Import is generally preferred over manual data entry, since import is a computer-implemented process and is substantially more efficient, as well as less tedious, than manual data entry.

To facilitate discussion, FIG. 1A illustrates a screen shot of a prior art import screen, representing the mechanism by which the user of a prior art personal information manager program (in this case, ACT! by Symantec of Cupertino, Calif.) may employ to import data created in a previous personal information manager program into ACT! In prior art import window 102, there are shown a list of import data fields 104 and a list of target headers 106. List of import data fields 104 represents the list of data items in one of the import records of the import database, typically (but not necessarily) the first record. List of target headers 106 represents the list of target data headers present in a target record of the target database, e.g., ACT! in this case.

By mapping individual import data fields in list of import data fields 104 to individual target headers in list of target headers 106, the user can specify via prior art import window 102 the relationship between a given piece of import data in the import record and a target header in the target record. For example, the user may specify that the phone number 214-555-9665 in list of import data fields 104 should correspond to the "Fax Phone" target header in list of target headers 106, and telephone number 214-555-9876 in list of import data fields 104 should correspond to target header "Phone" in list of target headers 106.

To ease the task of importing data, some import data fields in list of import data fields 104 may be matched by default with some target headers in list of target headers 106. For these default matches, the user may either accept them or specify a different mapping between the import data field and the target header in the target record. By so specifying, the default match is overridden.

In prior art import window 102, the "MAP TO" mechanism 108 represents the mechanism by which the user of prior art import window 102 may specify a custom match between a given import data field and a target header in the target database of the ACT! program. To illustrate the operation of this "MAP TO" mechanism, import data field "Corporate Image Products" in prior art import window 102 is shown mapped by default to target header "Company" of list of target headers 106. If the user wishes to map this import data field to a different target header, e.g., target header "Contact" in list of target headers 106, he may first select this import data field for operation by, for example, clicking on this import data field to highlight it. The highlighting is shown in FIG. 1A. The user may then activate the "MAP TO" button 108 to bring up another window to permit the user to choose a different match for the selected import data item "Corporate Image Products".

FIG. 1B illustrates a map field window 150, representing the window through which the user may specify a different association between import data field "Corporate Image Products" and another target header of list of target headers 106 of FIG. 1A. Via map field window 150, the user may click on target header "Contact" to specify to the ACT! program that import data field "Corporate Image Products" should be mapped to header "Contact" for this target record. Further, the user also implies, through this custom match, that import data fields analogous to this import data item "Corporate Image Products" in subsequent import records should be mapped to target header "Contact."

Although the prior art import process permits, through a combination of default and custom matches, data created in one database management program to be imported into another database management program, there are many disadvantages. For example, it is not always intuitive to a novice user how to perform a custom match between an import data field and a target header. In other words, the relationship between prior art import window 102 and map field window 150 is not always intuitively clear.

Further, the prior art import process in ACT! is relatively inefficient since the user is forced to focus on one import data field at a time, and must bring up a custom map field window similar to map field window 150 whenever a change in mapping needs to be made. Additionally, map field window 150 is given without context and in many cases, it is not known from looking at map field window 150 whether a particular target header shown in map field window 150 has already been mapped with another import data field, and therefore unavailable for mapping.

Further, prior art import window 102 and map field window 150 do not provide the user with a familiar visual context. For example, prior art import window 102 and list of target headers 106 have a different layout than the window employed for manual data entry in ACT!. This is a disadvantage since the window employed for manual entry typically represents the window most frequently employed in interacting with the database program and is therefore most familiar to users. In forcing the user to employ a window having a different layout to import data, the prior art does not gain leverage from the user's familiarity with the window the user is already familiar with, e.g., the window employed for manual data entry.

In addition, the lack of visual context makes it difficult for the user to make mapping decisions with regards to certain target headers. For example, target header "Last Results" in list of target headers 106 lacks visual context when it is displayed in the format of prior art import window 102 since, for example, the user has no information regarding the relationship between this target header and other target headers in the target record. Accordingly, the user may experience difficulties in trying to decide which import data field in list of import data fields 104 should be mapped to this target header.

In view of the foregoing, there are desired improved techniques for importing data stored in an import database format into a target database management program having a different format. Among other usability improvements, the improved techniques preferably permit the user to perform data import in an intuitive and efficient manner while leveraging the user's familiarity with other windows of the target database management program.

SUMMARY OF THE INVENTION

The invention relates, in one embodiment, to a computer-implemented method in a computer for importing data from an import database to a target database. The target database is configured for use in a database management program and having a plurality of target records each including a plurality of target data fields corresponding to a plurality of target headers. The import database has a plurality of import records each including a plurality of import data fields corresponding to a plurality of import headers.

The method includes displaying a plurality of import items associated with one of the plurality of import records in an import window of a display screen of the computer. The plurality of import items represent at least one of the plurality of import data fields and the plurality of import headers associated with the one of the plurality of import records.

There is further included displaying a target window in the display screen, thereby causing the target window to appear simultaneously with the import window in the display screen. The target window includes a plurality of target data fields corresponding to a plurality of target headers and substantially resembles one of a window employed for manual data entry of records and a window employed for data display for the database management program.

The method further includes moving an import item of the plurality of import items in the import window to a position in the target window. The position corresponds to a target item of a target record of the target database, the target item representing a target data field if the item represents one of the plurality of import data fields. The target item represents a target header if the item represents one of the plurality of import headers.

In another embodiment, the invention relates to a computer readable media having program instructions stored therein. The instructions are configured for use in a computer for importing data from an import database to a target database. The target database is configured for use in a database management program and having a plurality of target records each including a plurality of target data fields corresponding to a plurality of target headers. The import database has a plurality of import records each including a plurality of import data fields corresponding to a plurality of import headers.

The computer readable media includes program instructions for displaying a plurality of import items associated with one of the plurality of import records in an import window of a display screen of the computer. The plurality of import items represents at least one of the plurality of import data fields and the plurality of import headers associated with the one of the plurality of import records.

The computer readable media further includes program instructions for displaying a target window in the display screen, thereby causing the target window to appear simultaneously with the import window in the display screen. The target window includes a plurality of target data fields corresponding to a plurality of target headers and substan-tially resembles one of a window employed for manual data entry of records and a window employed for data display for the database management program.

Additionally, the computer readable media further includes program instructions for moving an import item of the plurality of import items in the import window to a position in the target window. The position corresponds to a target item of a target record of the target database. The target item represents a target data field if the item represents one of the plurality of import data fields. The target item represents a target header if the item represents one of the plurality of import headers.

These and other advantages of the present invention will become apparent upon reading the following detailed descriptions and studying the various figures of the drawings.

BRIEF DESCRIPTION OF THE DRAWINGS

To facilitate discussion.

FIG. 2A shows, in accordance with another embodiment of the present invention, a screen shot of an import window containing import headers and a target window to facilitate data importation.

DETAILED DESCRIPTION OF THE PREFERRED EMBODIMENTS

Figure 1A:
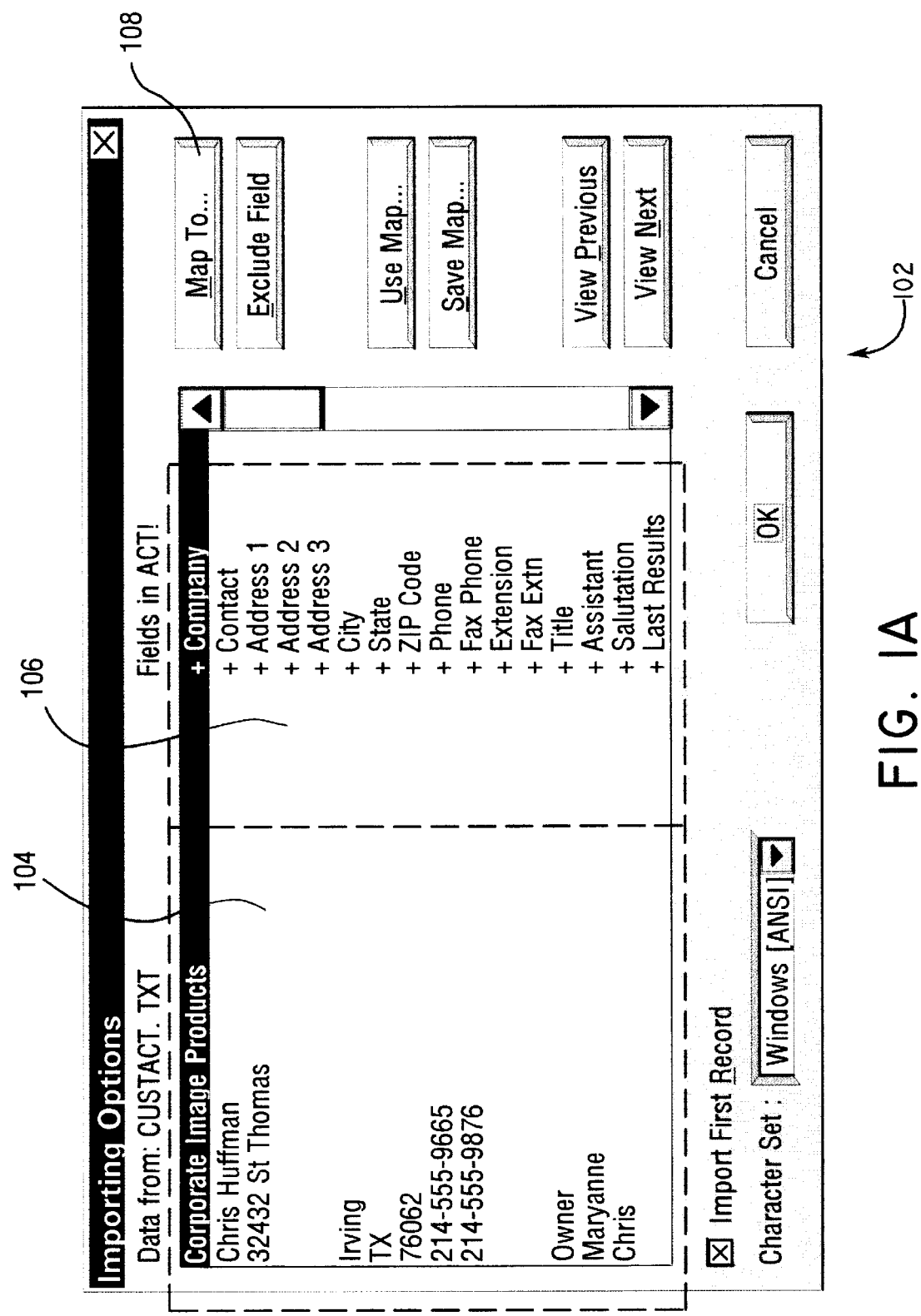
FIG. 1A illustrates a screen shot of a prior art import screen of a personal information manager program known as ACT! by Symantec, Inc. of Cupertino, Calif.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

To facilitate discussion of the advantages of the present invention, FIG. 2A shows, in accordance with one embodiment of the present invention, a screen shot of an import window and a target window for use during the import of data. Import window 200 represents the window for displaying the import items, i.e., either the import data fields or import headers to be mapped to the corresponding target data fields or target headers of the target record. The user can choose (e.g., via a preference setting) whether the import data fields or import headers should be displayed in import window 200. In the example of FIG. 2A, the import headers are shown. The ability to permit the user to specify for display either the import header or the import data fields in import window 200 advantageously improves user-friendliness and usability, since some users may prefer to view the import data fields during the import process. This is particularly true if the import record is one that the user knows well, and the display of the import data fields provides the user with additional visual or cognitive context during the import process.

Target window 202 represents the window for displaying the target headers and target data fields of a target record into which the import items in import window 200 may be mapped. As the term is used herein, a header functions as a data descriptor, i.e., it describes its associated data field. For example, target header "first" describes or characterizes the data within data field 204 (currently contains data related to "First_Name"). Although FIG. 2A shows import window 200 being adjacent to target window 202 and integrated together as a single window visually, it is contemplated that these windows may be physically separate and may be placed anywhere on the display screen relative to one another.

In accordance with one particularly advantageous aspect of the present invention, target window 202 substantially resembles the window typically employed for manual data entry into target records of the target database. Since the window employed for manual data entry typically represents the window with which the user has the most familiarity, the use of a substantially similar window for import purposes advantageously leverages the user's familiarity and minimizes any additional training that the user has to undergo to perform data import. Additionally, target window 202, being substantially similar to the window employed for manual data entry, also supplies visual context for its data, thereby assisting the user in matching up individual import items in import window 200 to either the target headers or target data fields of target window 202. By way of example, it is found that the visual context provided through the use of a window that is familiar to the user helps give meaning to the target data headers, thereby allowing the user to perform the import process more efficiently.

Some import items may be matched by default with their corresponding target data fields without user intervention. The automatic matching process may be performed in accordance with some predefined matching rules, which may be tailored to the particulars of the import and/or target database programs. The import data that has been matched with their corresponding target data fields in target window 202 may be flagged in import window 200 or, preferably, inserted into the corresponding target data fields within target window 202 and removed from import window 200 altogether.

For example, import item "Company_Name" is shown in target window 202 as having been automatically mapped to the target data field corresponding to target header "Company". If the user accepts this match, nothing needs to be done, and the import data field corresponding to the import header "Company_Name" in each subsequent import record of the import database is automatically matched up with the target data field corresponding to target header "Company" in a respective subsequent target record of the target database.

If the match is unacceptable, the user may drag the import item "Company_Name" out of target window 202 and drop that import item back into import window 200 for a subsequent custom match. Alternatively, the user may drag this import item "Company_Name" from the target data field associated with target header "Company" directly to another target data field or target header in target window 202 for custom matching. Once this is performed, the custom match overrides the earlier default match for this record and for all subsequent target records of the target database.

Figure 1B:
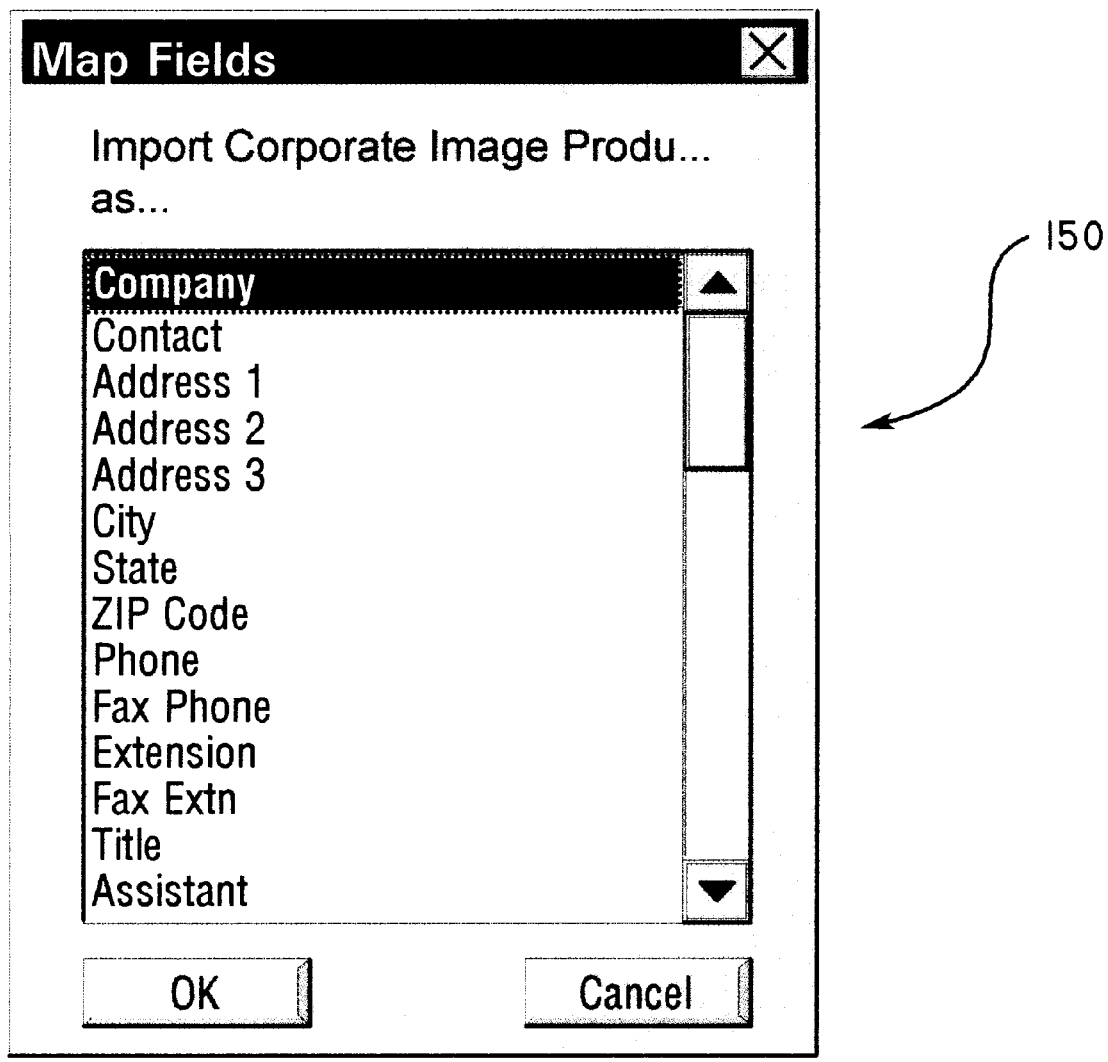
FIG. 1B illustrates a map field window, representing the window through which the user may specify a custom mapping between an import item and a target data field of the target database.

Note that the user is able to employ the same target window for custom mapping, which is unlike certain prior art techniques wherein the user is required to call up another map field window, e.g., map field window 150 of FIG. 1B, for custom mapping of an import item. Additionally, the action required to perform custom mapping is very similar to the action taken by the user in entering data, i.e., simply placing the data item in the appropriate target data field. Advantageously, the user is able to perform data import with less training and a greater level of efficiency since not only does the import screen look familiar to the manual entry screen with which the user is accustomed, but the actions required for custom mapping is also analogous to actions required for manual data entry, which are typically already familiar to the user.

In accordance with one aspect of the present invention, an import item may be matched with either a target header or a target data field. For example, import item "First_Name" may be dragged from import window 200 and dropped into target data field 204 (as shown in FIG. 2A) to signify that subsequent import data fields associated with import header "First_Name" of the import database should be matched with the target data field associated with target header "First" for subsequent records of the target database.

Alternatively, this import header "First_Name" may be matched with target header "First". In this case, the user signifies that subsequent import data fields associated with import header "First_Name" of the import database should be matched with the target data field associated with target header "First" for subsequent target records of the target database. Additionally, the target header is changed from "First" to "First_Name" responsive to the user's custom matching. The ability to allow the user to change the target header (e.g., from "First" to "First_Name") advantageously renders the target database more user-friendly since it allows the user to work with data headers that he is already familiar with from the import database program. As a further refinement, the invention also permits the user to edit a target header and/or target data field manually during import, e.g., to create a header label that does not exist in either databases. This is in contrast to prior art import processes, which typically regard target headers as static, unchangeable titles.

In one embodiment, the user may be provided with visual feedback via standard drag and drop mechanisms to inform the user of the permissible locations in target window 202 where the user may drop the import item which the user is currently dragging. To further improve usability, it is possible to specify some other user interface action to indicate mapping and unmapping, e.g., highlighting a destination and double clicking on an item to move that item to the highlighted destination. A mapping may be undone when the user drags the mapped import item out of target window 202 (e.g., into import window 200).

Figure 2B:
FIG. 2B shows, in accordance with one embodiment of the present invention, a screen shot of an import window containing import data fields and a target window to facilitate data importation.

FIG. 2B shows, in accordance with another embodiment, another import screen in which the import items in import window 200 are shown as import data fields instead of import headers. The import data fields are displayed in import window 200 when, for example, the import database has no import header information (e.g., when importing from a text file) or when the user chooses (e.g., through some preference setting) that the import data fields should be displayed in import window 200. The user may prefer to look at the import data fields while performing data import as it may provide, for some user, more context for the import operation.

As before, the user may map an import data field from import window 200 to a corresponding target data field in target window 202. For example, the user may drag import data field "Provo" from import window 200 and drop it into target data field 250 to map it to target data field 250. Thereafter, import data fields in subsequent import records of the import database that are analogous to this import data field are mapped to corresponding target data fields in subsequent target records of the target database.

As will be apparent to those skilled in the art given this disclosure, the inventive data import technique may advantageously be implemented using any conventional programming technique and language. For example, the design of the import window and target window, as well as the import action that maps an import item to its target, may be programmed using either a structured programming approach or object-oriented approach, e.g., any of the conventional languages such as Visual Basic, Pascal, C, C++, Java, or the like. It is felt that the particular choice of programming language and/or program design methodology is not particularly relevant. The important concept, the implementation of which is fully disclosed herein, is to design an import process to maximize efficiency, ease of use, and to leverage the user's familiarity with other details and/or windows of the target database program.

Figure 3:
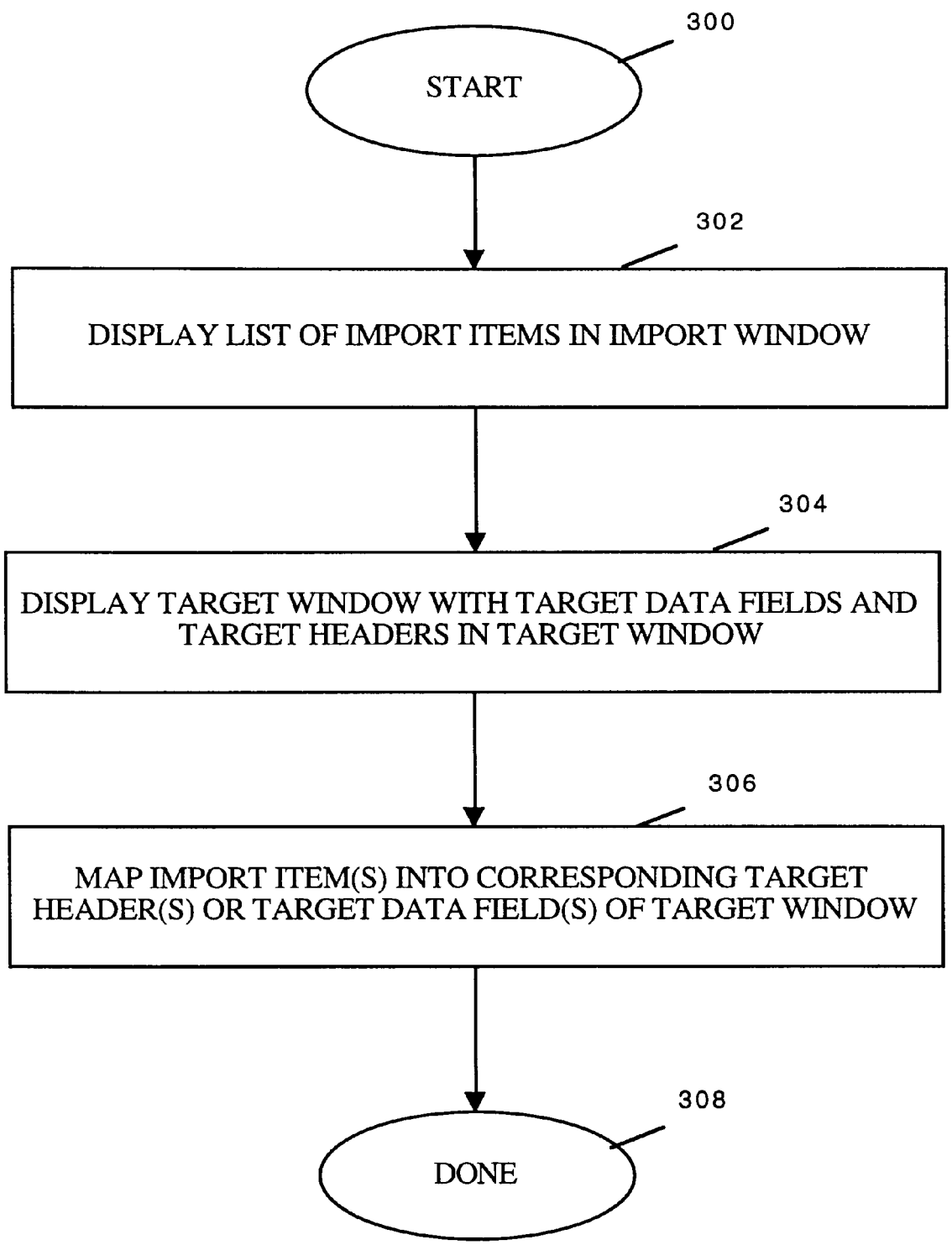
FIG. 3 illustrates, in a flow chart format, the steps involved in importing data in accordance with one embodiment of the present invention.

FIG. 3 illustrates, in a flow chart format, the steps involved in importing data in accordance with one embodiment of the present invention. In step 302, the list of unmapped import items are displayed in an import window on the computer display screen. As mentioned previously, these import items may represent either the import headers or the import data fields, depending on the user's preference and/or the nature of the import database. In one embodiment, the import items that are already mapped, whether automatically or by the user, are either not shown or are flagged in the import window.

In step 304, the target window with target data fields and target headers is displayed on the computer screen to facilitate data import. This target window is shown, for example, in FIGS. 2A and 2B as target window 202. In one embodiment, the target window advantageously substantially resembles the window employed for manual entry of data into the target database. In this manner, the user's familiarity with this manual data entry window can be leveraged to provide the user with useful visual context for the data import process.

Alternatively or additionally, the target window displayed in step 304 may substantially resemble the window employed for displaying data in the target database management program. For example, the target window displayed in step 304 to facilitate the import process may substantially resemble the window employed to display biographical data in a personal information manager (PIM) program. This aspect of the invention is particularly advantageous if the user is more familiar with the window employed for displaying data than the window employed for manual data entry.

In one embodiment, the user may be presented with choices regarding the format of the import window. For example, the user may be able to choose among an import window that substantially resembles the window employed for manual data entry, an import window that substantially resembles the window employed for displaying data, or even one that substantially resembles yet another window that the user may be already familiar with.

Irrespective of the format of the target window employed for data import, it is highly preferable that the target window be arranged to maximize leverage of the user's familiarity with the database management program, i.e., to permit the user to perform the import process using a screen layout with which the user is familiar and without requiring the user to learn a whole new import screen. For usability reasons, it is also highly preferable, as mentioned earlier in connection with FIGS. 2A and 2B, that custom mapping and unmapping be performed with this target window without requiring the user to resort to yet another window, as in the case of prior art FIG. 1B.

In step 306, the import items are mapped into the corresponding target headers/target data fields of the target screen. As mentioned earlier, some of the import items may already have been mapped by default. Import items which require custom mapping, whether already mapped into the target window or still unmapped, are then mapped using the displayed target window and the list of import items displayed in the import window. Preferably, the mapping is performed in a visually intuitive manner such as dragging and dropping, or highlighting an item and clicking on its destination to perform the move.

Note that the invention does not require the user to focus on one piece of import data at a time. In the prior art, the user must select an import item in the prior art import window (e.g., import window 102 in the example of FIGS. 1A and 1B), switch to a different screen to perform custom matching (e.g., via the "MAP TO" mechanism), and return back to the prior art import window to perform mapping of other import items. The present invention permits the user to perform custom mapping on multiple data fields in the same import window without switching from one window to another window and back, thereby improving efficiency and ease of use.

Figure 4:
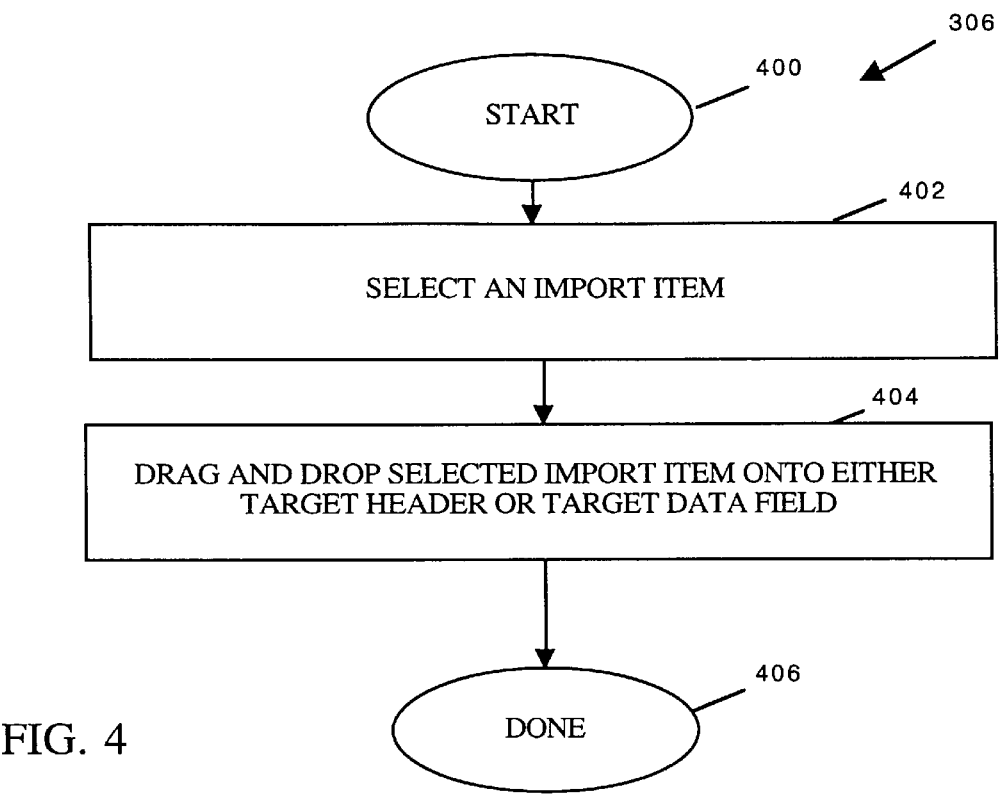
FIG. 4 illustrates, in accordance with a preferred embodiment of the present invention, the steps involved in custom mapping an import item.

FIG. 4 illustrates, in accordance with a preferred embodiment of the present invention, the steps involved in mapping step 306 of FIG. 3. In FIG. 4, mapping is preferably performed via a drag and drop operation. In step 402, an import item, e.g., an import header or an import data field, is selected. In step 404, the selected import item is dragged and dropped onto the corresponding target header/target data field in the target window. In one embodiment, both the selection and the dragging-and-dropping may be a continuous motion. For example, the user may be able to depress the mouse button while the pointer is over an import item to select it and then drag the selected item (while keeping the button depressed) to its destination for dropping (e.g., release the depressed button).

During dragging and dropping, the selected import item may be displayed in transit to assist the user in remembering the content of the import item selected and to help the user in his decision regarding the destination for the selected import item. If the destination in the target window contains a previously matched import item, dropping another import item into the same destination may, in one embodiment, "flop" the import items, i.e., the previously matched import item may be reverted back to the unmapped import item list in the import window, and the new import item may be dropped in that destination.

Figure 5:
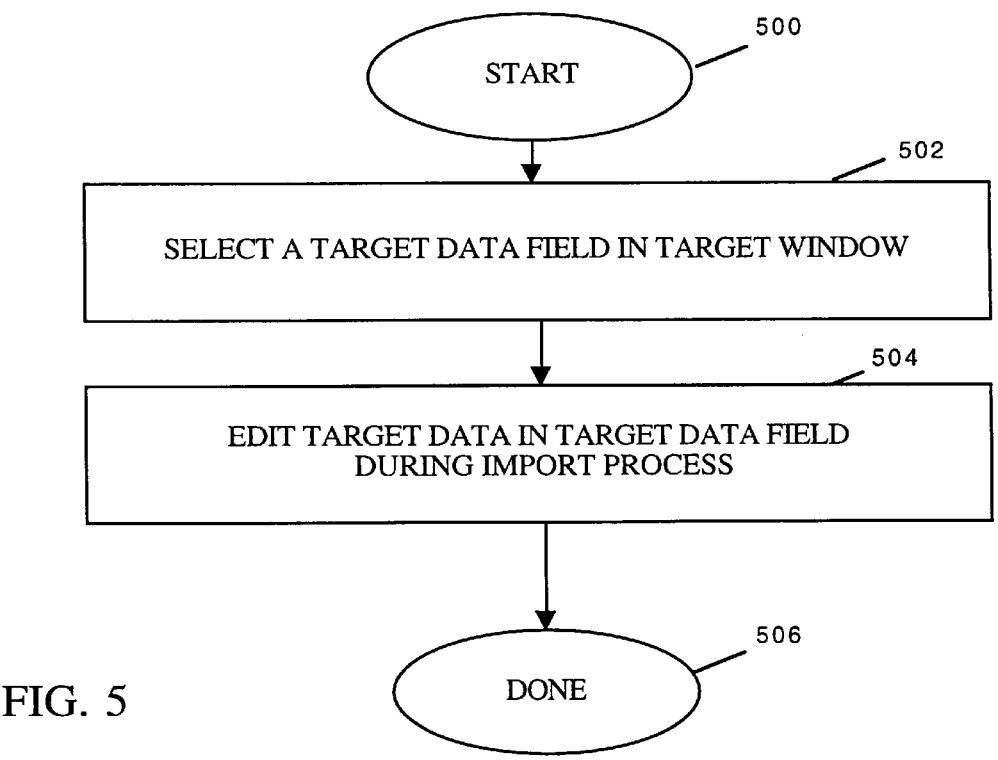
FIG. 5 illustrates, in accordance with a preferred embodiment of the present invention, the steps involved in editing target data while importing.

A technique for altering the target data header has already been discussed in connection with FIG. 2A. In accordance with one aspect of the present invention, the data in the target data field of the target window is also editable during the import process. With reference to FIG. 2B, for example, the present invention advantageously permits the target data "Adams" in the target data field associated with target header "Last" to be editable during the import process. For example, if Melissa Adams has changed her name to Melissa Williams, the user may, during import, place the cursor in the target data field associated with target header "Last" to select this target data field (step 502 of FIG. 5). The user may then begin to edit as if he or she is entering data for the first time (step 504 of FIG. 5). Of course, editing may take other forms, e.g., selecting from a pop-up list of predefined choices and/or via other conventional editing techniques. In a one embodiment, scroll up button 252 and scroll down button 254 are advantageously provided to allow the user to flip through the target records to edit target data fields in individual records. The ability to edit while importing advantageously increases the quality of the imported data by allowing the user to perform a quality check and correction during the import process.

In accordance with yet another aspect of the present invention, the user may specify during the import process whether a given target record should be incorporated into the target database. In one embodiment, the selection of a target record for incorporation into the target database is made by checking an option in the target window, e.g., "Use This Record" option 256 in target window 202 of FIG. 2B. To further improve ease of use, the user may specify via a preference setting that this option should be selected for every target record as a default, and the user can deselect each individual record if desired. The ability to selectively incorporate or not incorporate a particular target record into the target database finishes the user with an additional level of control over the import process.

In accordance with yet another aspect of the present invention, the user may select via a preference setting, either through a pull-down menu or in a preference window, certain filters in order to further customize the import process. For example, the user may specify that only non-duplicate records should be imported. In other words, if both the target database and the import database contain the same records, the import record from the import database would not be imported into the target database. Duplicate records can be defined programmatically or interactively by the user, e.g., by similarity in phone numbers, last name, first name, company, or the like, or a combination thereof.

Another filter may specify that all import records from the import database should be imported into the target database, including duplicate records. If both the import database and the target database contain the same records, the end result will include two identical records, one from each database. Alternatively, the user may specify that all records should be imported, and records that are defined as duplicates should be replaced in the target database with the imported records. Using the previous example, if the target database and the import database both contain records with the same telephone number (and records with the same telephone number have been defined as duplicate records), the target database in its final state should contain only the record from the import database. By providing various filter options with the import process, the present invention permits the user to screen out records from the import database that do not satisfy the filters. Consequently, these filters furnish a further level of control for the user in the import process.

Additionally, there is provided an option to permit the user to choose to back up all records of the target database prior the import process. If for some reason the import process is unsatisfactory, the user may be able to undo the import process from the backup copy to restore the target database back to its original state prior to the start of the import process. In one embodiment, data backup and restoration is performed using SQL calls. SQL is well known to those skilled in the art of database programming and is not described in detail here in order not to unnecessarily obscure the invention.

Figure 6:
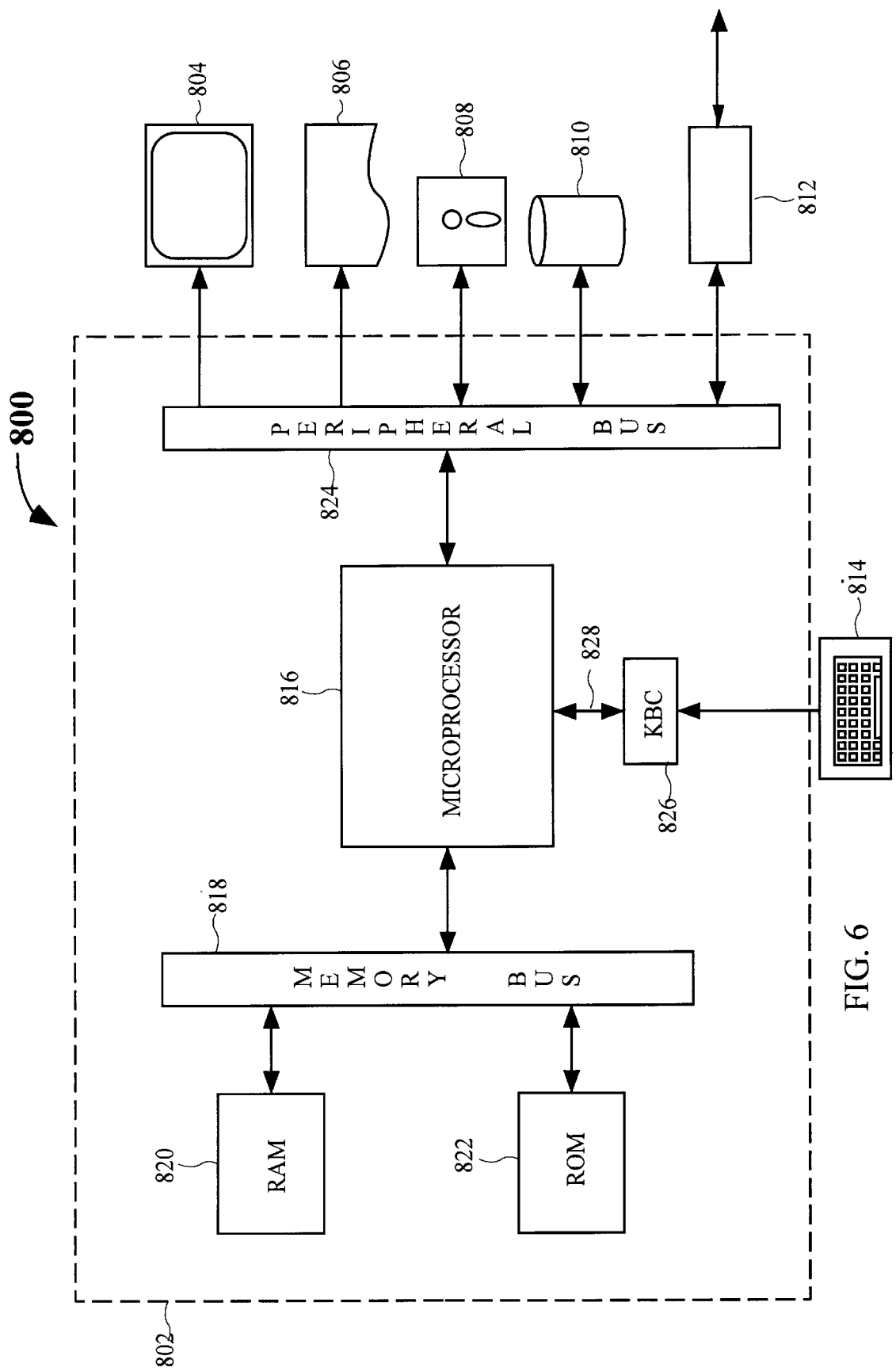
FIG. 6 is a block diagram of an exemplar computer system for carrying out the inventive data import technique.

FIG. 6 is a block diagram of an exemplar computer system 800 for carrying out the data import technique according to the invention. The computer system 800 includes a display screen (or monitor) 804, a printer 806, a floppy disk drive 808, a hard disk drive 810, a network interface 812, and a keyboard 814. The computer system 800 includes a microprocessor 816, a memory bus 818, random access memory (RAM) 820, read only memory (ROM) 822, a peripheral bus 824, and a keyboard controller 826. The computer system 800 can be a personal computer (such as an Apple computer, e.g., an Apple Macintosh, an IBM personal computer, or one of the compatibles thereof), a workstation computer (such as a Sun Microsystems or Hewlett-Packard workstation), or some other type of computer.

The microprocessor 816 is a general purpose digital processor which controls the operation of the computer system 800. The microprocessor 816 can be a single-chip processor or can be implemented with multiple components. Using instructions retrieved from memory, the microprocessor 816 controls the reception and manipulation of input data and the output and display of data on output devices.

The memory bus 818 is used by the microprocessor 816 to access the RAM 820 and the ROM 822. The RAM 820 is used by the microprocessor 816 as a general storage area and as scratch-pad memory, and can also be used to store input data and processed data. The ROM 822 can be used to store instructions or program code followed by the microprocessor 816 as well as other data.

The peripheral bus 824 is used to access the input, output, and storage devices used by the computer system 800. In the described embodiment, these devices include the display screen 804, the printer device 806, the floppy disk drive 808, the hard disk drive 810, and the network interface 812. The keyboard controller 826 is used to receive input from keyboard 814 and send decoded symbols for each pressed key to microprocessor 816 over bus 828.

The display screen 804 is an output device that displays images of data provided by the microprocessor 816 via the peripheral bus 824 or provided by other components in the computer system 800. The printer device 806 when operating as a printer provides an image on a sheet of paper or a similar surface. Other output devices such as a plotter, typesetter, etc. can be used in place of, or in addition to, the printer device 806.

The floppy disk drive 808 and the hard disk drive 810 can be used to store various types of data. The floppy disk drive 808 facilitates transporting such data to other computer systems, and hard disk drive 810 permits fast access to large amounts of stored data.

The microprocessor 816 together with an operating system operate to execute computer code and produce and use data. The computer code and data may reside on the RAM 820, the ROM 822, or the hard disk drive 820. The computer code and data could also reside on a removable program medium and loaded or installed onto the computer system 800 when needed. Removable program mediums include, for example, CD-ROM, PC-CARD, floppy disk and magnetic tape.

The network interface circuit 812 is used to send and receive data over a network connected to other computer systems. An interface card or similar device and appropriate software implemented by the microprocessor 816 can be used to connect the computer system 800 to an existing network and transfer data according to standard protocols.

The keyboard 814 is used by a user to input commands and other instructions to the computer system 800. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

While this invention has been described in terms of several preferred embodiments, there are alterations, permutations, and equivalents which fall within the scope of this invention. For example, although the import headers and/or import data fields are displayed as a list in the import window to facilitate ease of discussion, they may also be displayed in an import window that looks substantially similar to the display window customarily employed by the user in the import, i.e., source, database management program. Since the import headers and/or data fields are displayed in the format that the user is accustomed to seeing, the user's familiarity with the import headers and/or import data fields is advantageously leveraged, thereby improving ease of use. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a computer, a computer-implemented method for importing data from an import database to a target database, said target database being configured for use in a target database management program and having a plurality of target records each including a plurality of target data fields corresponding to a plurality of target headers, said import database having a plurality of import records each including a plurality of import data fields corresponding to a plurality of import headers, comprising:

displaying a plurality of import items associated with one of said plurality of import records in an import window of a display screen of said computer, said plurality of import items representing at least one of said plurality of import data fields and said plurality of import headers associated with said one of said plurality of import records;

displaying a target window on said display screen, thereby causing said target window to appear simultaneously with said import window on said display screen, said target window including a plurality of target data fields corresponding to a plurality of target headers and substantially resembles one of a window employed for manual data entry of records and a window employed for data display for said target database management program; and moving, responsive to command by a user of said computer, an import item of said plurality of import items displayed in said import window to a position in said target window, said position corresponds to a target item of a target record of said target database, said target item representing a target data field if said item represents one of said plurality of import data fields, said target item representing a target header if said item represents one of said plurality of import headers.

2. The method of claim 1 wherein said moving includes dragging said import item from said import window to said position in said target window.

3. The method of claim 1 wherein said plurality of target data fields in said target window represents a plurality of blank data fields.

4. The method of claim 1 wherein at least one of said plurality of target data fields in said target window is an import data field also displayed in said import window, said at least one of said plurality of target data fields being matched with said import data field according to a pre-defined matching pattern prior to said moving.

5. The method of claim 1 wherein said import item is editable in said target window after said moving.

6. The method of claim 5 wherein said import item represents said target data field, said target data field being editable in said target window after said moving.

7. The method of claim 1 wherein said import item represents said target header, said target header being editable in said target window after said moving.

8. The method of claim 1 wherein said target window is adjacent said import window in said display screen.

9. The method of claim 1 further comprising associating items analogous with said import item in said plurality of import records with items analogous with said target item in said plurality of target records.

10. A computer readable media having program instructions stored therein, said instructions being configured for use in a computer for importing data from an import database to a target database, said target database being configured for use in a target database management program and having a plurality of target records each including a plurality of target data fields corresponding to a plurality of target headers, said import database having a plurality of import records each including a plurality of import data fields corresponding to a plurality of import headers, said computer readable media comprising:

program instructions for displaying a plurality of import items associated with one of said plurality of import records in an import window of a display screen of said computer, said plurality of import items representing at least one of said plurality of import data fields and said plurality of import headers associated with said one of said plurality of import records;

program instructions for displaying a target window on said display screen, thereby causing said target window to appear simultaneously with said import window on said display screen, said target window including a plurality of target data fields corresponding to a plurality of target headers and substantially resembles one of a window employed for manual data entry of records and a window employed for data display for said target database management program; and program instructions for moving, responsive to command by a user of said computer, an import item of said plurality of import items displayed in said import window to a position in said target window, said position corresponds to a target item of a target record of said target database, said target item representing a target data field if said item represents one of said plurality of import data fields, said target item representing a target header if said item represents one of said plurality of import headers.

11. The computer readable media of claim 10 wherein said import item is editable in said target window after said moving.

12. The computer readable media of claim 10 wherein said import item represents said target data field, said target data field being editable in said target window after said moving.

13. The computer readable media of claim 10 wherein said import item represents said target header, said target header being editable in said target window after said moving.

14. The computer readable media of claim 10 wherein said target window is adjacent said import window in said display screen.

15. In a computer, a computer-implemented method for importing data from an import database to a target database, said target database being configured for use in a target database management program and having a plurality of target records each including a plurality of target data fields corresponding to a plurality of target headers, said import database having a plurality of import records each including a plurality of import data fields corresponding to a plurality of import headers, comprising:

displaying a plurality of import items associated with one of said plurality of import records in an import window of a display screen of said computer, said plurality of import items representing at least one of said plurality of import data fields and said plurality of import headers associated with said one of said plurality of import records;

displaying a target window on said display screen, thereby causing said target window to appear simultaneously with said import window on said display screen, said target window including a plurality of target data fields corresponding to a plurality of target headers; and moving, responsive to command by a user of said computer, an import item of said plurality of import items displayed in said import window to a position in said target window, said position corresponds to a target item of a target record of said target database, said target item representing a target data field if said item represents one of said plurality of import data fields, said target item representing a target header if said item represents one of said plurality of import headers.

16. The method of claim 15 wherein said import window substantially resembles a display window of an import database management program, said display window of said import database management program represents a window employed for displaying record data of said import database when said import database management program is executed.

17. The method of claim 16 wherein said target window substantially resembles a window employed for manual data entry of records for said target database management program.

18. The method of claim 15 wherein said target window substantially resembles a window employed for data display of records for said target database management program.

19. The method of claim 15 wherein said moving includes dragging said import item from said import window to said position in said target window.

20. The method of claim 15 wherein said target window substantially resembles a window employed for manual data entry of records for said target database management program.

* * * * *